July 13, 1965 C. N. BREWER 3,194,493

APPARATUS FOR EFFECTING ALTERNATE OPERATION OF THE SHIFT AND UNSHIFT KEYS OF A TAPE PERFORATING MACHINE

Filed Oct. 16, 1963 3 Sheets-Sheet 1

INVENTOR

CLAIRE N. BREWER

BY Scrivener & Parker

ATTORNEYS

July 13, 1965 C. N. BREWER 3,194,493

APPARATUS FOR EFFECTING ALTERNATE OPERATION OF THE SHIFT AND UNSHIFT KEYS OF A TAPE PERFORATING MACHINE

Filed Oct. 16, 1963 3 Sheets-Sheet 2

INVENTOR

CLAIRE N. BREWER

BY Scrivener & Parker

ATTORNEYS

July 13, 1965 C. N. BREWER 3,194,493

APPARATUS FOR EFFECTING ALTERNATE OPERATION
OF THE SHIFT AND UNSHIFT KEYS OF
A TAPE PERFORATING MACHINE

Filed Oct. 16, 1963 3 Sheets-Sheet 3

INVENTOR
CLAIRE N. BREWER

BY Scrivener & Parker
ATTORNEYS

United States Patent Office 3,194,493

Patented July 13, 1965

3,194,493

APPARATUS FOR EFFECTING ALTERNATE OPERATION OF THE SHIFT AND UNSHIFT KEYS OF A TAPE PERFORATING MACHINE

Claire N. Brewer, Indianapolis, Ind., assignor to International Typographical Union of North America, Colorado Springs, Colo.

Filed Oct. 16, 1963, Ser. No. 316,622
9 Claims. (Cl. 234—23)

This application is a continuation-in-part of my copending application Serial No. 232,770, filed October 24, 1962, now Patent No. 3,113,718 granted December 10, 1963, for Apparatus for Effecting Sequential Operation of the Keys of a Tape Perforating Machine.

*Specification*

Figure 1:
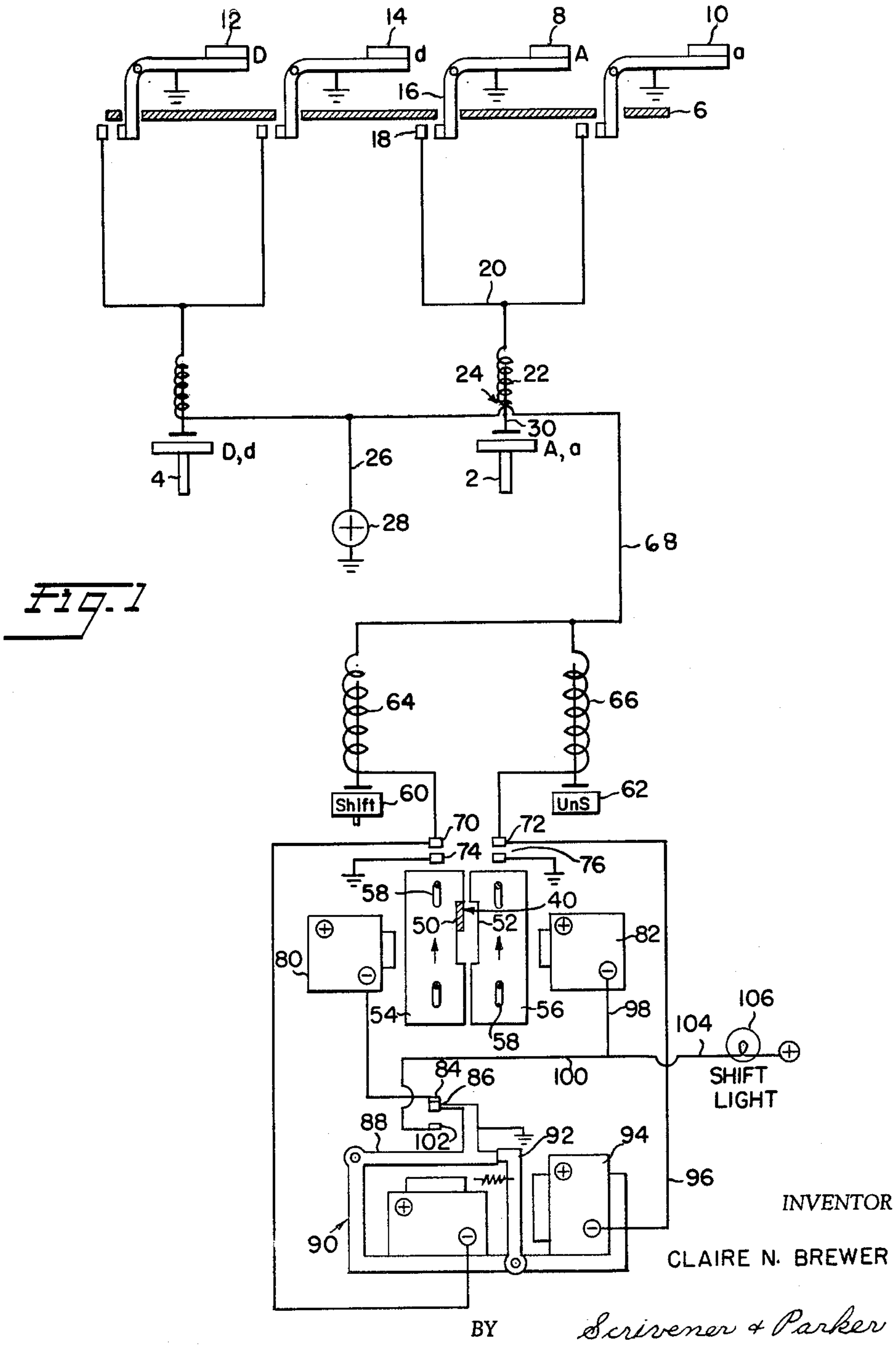
FIG. 1 is a circuit diagram showing operating means for some of the character keys of the keyboard of a tape perforating machine, and, showing also a preferred embodiment of the means provided by the invention for operating the shift and unshift keys of a tape perforating machine.

This invention relates broadly to the operation of the keyboards of machines which are used in the art of typecasting and typesetting, and it will be particularly described in this specification in connection with, and as applied to, a machine which perforates tape which is used in the operation and control of a typesetting or typecasting machine such as the Linotype, Intertype and Monotype machines.

It has, for many years, been the general practice in the printing art to cast and set type by the use of machines such as the Linotype. Such machines are equipped with a special keyboard usually having ninety keys, although sometimes a greater and sometimes a lesser number of keys are provided, and the operation of such machines must be performed by highly skilled personnel who are able to operate the special keyboard and perform other duties essential to the most efficient operation of these very complex machines.

It has heretofore been proposed to operate such typecasting machines by means of a perforated tape prepared on a machine having a keyboard which corresponds to the standard typewriter keyboard with the addition of certain keys for performing operations and producing characters which are necessary in printing but not in typewriting. Such machines are now available commercially, a typical one being known as the Teletypesetter. It has been found, however, that the overall efficiency and cost of typecasting with the use of such tape perforating machines are less favorable than the efficiency and cost of operation with the use of Linotype operators who are particularly skilled in the operation of typecasting machines having the standard Linotype keyboard. The use of machines for perforating tape for the operation of typecasting machines has become widespread, however, and it has been found that further and very important advantages are produced in the over-all efficiency and costs of a printing plant by the operation of such tape perforating machines by skilled operators having knowledge of the entire typecasting, typesetting and printing operations and, particularly, being skilled in the use of the standard Linotype keyboard.

The keyboard of such a tape perforating machine has one of each of all of the character keys of the conventional typewriter keyboard, arranged in the same positions, and also has additional character keys which are required for printing but are not required for typewriting. In addition, this keyboard has a shift key and an unshift key which, when operated, produce characteristic tape perforations which cause the typecasting machine operated by the tape to set upper case or lower case characters corresponding to subsequent tape perforations, depending on which of the shift and unshift keys was last operated. Thus, for example, operation of the "A" key will always produce the same characteristic tape perforation, but the typesetting machine operated by the tape will cast an upper case "A" or a lower case "a" depending on whether the shift or unshift key was last operated prior to operation of the "A" key.

In my United States Letters Patent Nos. 2,679,902 and 2,737,240 I have described and claimed means for operating the keyboard of a tape perforating machine through the medium of the keys of a Linotype keyboard separate from and superimposed on the keyboard of the tape perforating machine and having, as is conventional with Linotype keyboards, separate keys for the upper and lower cases of each character. In the use and operation of these patented inventions means are provided which are operable upon depression of any upper case character key of the superimposed Linotype keyboard to first cause the shift key of the tape perforating machine to be depressed and then immediately released, provided the last previously operated character key was lower case, thus producing the characteristic "shift" tape perforation, and then to cause the corresponding letter key of the tape perforating machine keyboard to be depressed to produce its characteristic tape perforation. These means are also operable upon depression of any lower case character key of the superimposed keyboard to first cause the unshift key of the tape perforating machine to be depressed and then immediately released, provided the last previously operated character key was upper case, thus producing the characteristic "unshift" tape perforation, and then to cause the corresponding letter key of the tape perforating machine keyboard to be depressed to produce its characteristic tape perforation.

The present invention relates to the operation of tape perforating machines of the described type and utility, and to the Linotype keyboard and associated operating devices and means provided by the inventions of my aforesaid Letters Patent, which are superimposed on the keyboard of such a tape perforating machine to operate the keys thereof. It has been found in certain fields of use of such tape perforating machines, such as that of setting the type for telephone directory listings, that while the use of the superimposed Linotype keyboard provides the expected advantages of use of such a keyboard the automatic sequential operation of the shift or unshift key and the character key of the tape perforating machine keyboard is not required or advantageous. It is, however, advantageous to retain operation of the tape perforating machine keyboard through the Linotype keyboard, and this invention has therefore been particularly concerned with the retention of such operation without the described automatic sequential operation of the shift or unshift and character keys of the tape perforating machine keyboard.

It has therefore been the principal object of this invention to provide in connection with the operation of the keyboard of a machine for perforating tape used to control a typecasting machine by means of a superimposed Linotype keyboard to cause operation of the character key of the tape perforating machine keyboard corresponding to any depressed key of the Linotype keyboard, without automatic operation of the shift or unshift key of the tape perforating machine keyboard means, such as a single key, on the Linotype keyboard which, when sequentially operated, will alternately cause operation of the shift and unshift keys of the tape perforating machine keyboard.

Figure 2:
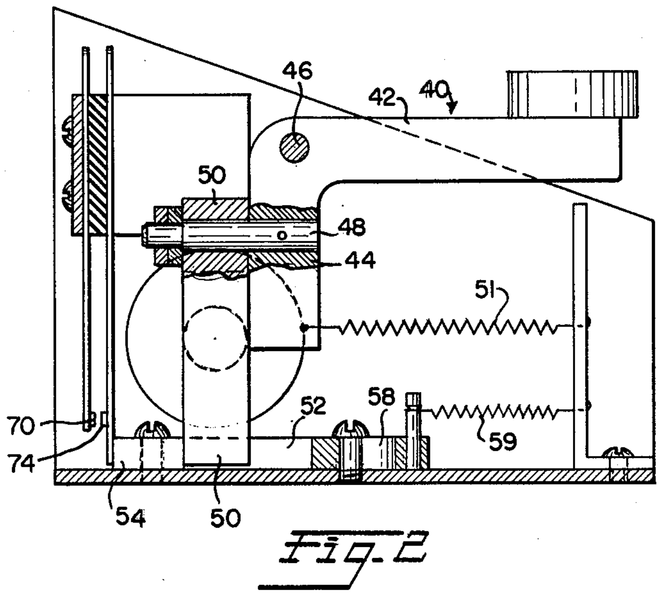
FIGS. 2 and 3 are, respectively, side and rear views of the means for operating the shift and unshift keys.
Figure 3:
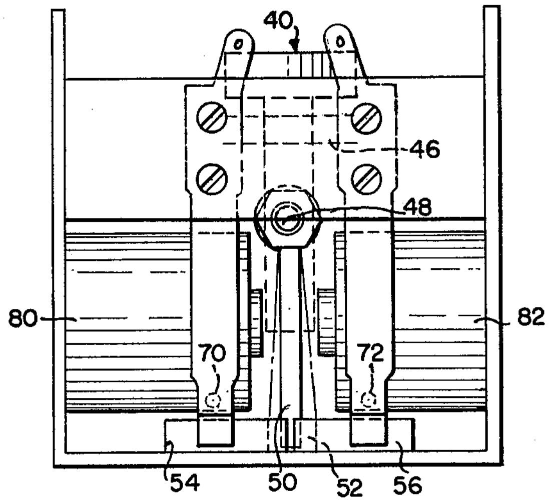

*Description—FIGS. 1, 2 and 3*

In FIG. 1 of the drawings forming part of this specification there are disclosed some of the keys of the keyboard of a tape perforating machine, together with some of the keys of the superimposed Linotype keyboard, and also the means operable upon depression of any character key of the Linotype keyboard for operating the corresponding character key of the keyboard of the tape perforating machine. There are, for example, illustrated in FIG. 1 the "A/a" key 2 of the tape perforating machine which, when depressed, causes operation of that machine to perforate tape with a characteristic perforation which will cause the typecasting machine operated by the tape to cast either the upper case "A" or the lower case "a" depending on whether the shift key or the unshift key of the tape perforating machine was last operated. There is also shown the "D/d" key 4 of the tape perforating machine, the operation of which to produce the characteristic tape perforation for the letter "D/d" is the same as that described in connection with the "A/a" key. In FIG. 1 there is also disclosed part of a Linotype keyboard 6 which is superimposed on the keyboard of the tape perforating machine, and which has, among the character and other keys found on a Linotype keyboard, an upper case and a lower case key for each letter of the alphabet. Thus, the keyboard shown in FIG. 1 has the upper case "A" key 8 and the lower case "a" key 10, the upper case "D" key 12 and the lower case "d" key 14. These keys are shown as representative of all of the keys of the Linotype keyboard representing letters or other characters which may cast in either upper case or lower case.

Means are disclosed in the drawing for causing operation of a character key of the tape perforating machine keyboard upon operation of either the upper case key or the lower case key of the same character of the Linotype keyboard. Thus, the upper case "A" key 8 of the Linotype keyboard is pivoted between its ends so that upon depression thereof a grounded part 16 of the key will be moved into engagement with a contact 18 which is connected through lead 20, the winding 22 of a solenoid 24, and lead 26 to one terminal of a source of electrical energy 28, the other terminal of which is grounded. The plunger 30 of solenoid 24 is operatively associated with the "A/a" key 2 of the tape perforating machine so that when the solenoid winding is energized the armature will be depressed to operate the key and cause the tape to be perforated with the characteristic "A/a" perforation. The lower case "a" key 10 of the Linotype keyboard is constructed and operative in the same way as the upper case "A," key 8, and upon depression of key 10 a circuit will be closed through the winding 22 of solenoid 24 to operate the "A/a" key of the tape perforating machine keyboard.

The circuits for causing operation of the "D/d" key 4 of the tape perforating machine keyboard upon depression of either the upper case "D" key 12 or the lower case "d" key 14 of the Linotype keyboard are also disclosed in FIG. 1 but as these circuits are the same in all respects as those described above in connection with the operation of the "A/a" key 2 of the tape perforating machine keyboard they need not be further described here.

It will be observed that in the foregoing described operation of the keys of the tape perforating machine keyboard by depression of the keys of the Linotype keyboard no means are provided for operation of the shift or unshift keys of the tape perforating machine keyboard and, in this way, the described structure, circuitry and operation differ from the inventions described and claimed in my aforesaid Letters Patent. However, it is necessary in perforating tape which is to be used in the operation of a typecasting machine to provide means for making shift and unshift perforations in order that the typecasting machine operated by the tape will cast either an upper case or a lower case letter, as desired.

Means are provided by the invention for operating either the shift key or the unshift key of the tape perforating machine keyboard in order to produce the required shift or unshift perforation and, in accordance with this invention, these means comprise a single key forming part of, or associated with, the Linotype keyboard and which is operative when successively depressed to alternately operate the shift key and the unshift key of the tape perforating machine keyboard. This key is shown at 40 in FIGS. 1, 2 and 3 and comprises, like the other keys of the Linotype keyboard, a horizontal part 42 and a depending vertical part 44, the key being pivoted at 46 about a horizontal axis so that on depression of the outer end of the horizontal part the depending vertical part of the key moves "forwardly."

The depending leg 44 of the key carries a forwardly extending pivot pin 48 and a second depending part 50 of the key is mounted at its upper end on this pin, whereby the lower part of the pin may swing about the pivot pin transversely of the rest of the key. A spring 51 constantly urges the key 40 to its normal undepressed position.

The lower end of the depending part 50 of key 40 is positioned within the rectangular space 52 formed by the open parts of two facing C-shaped members 54, 56 which are mounted on a suitable flat supporting surface (not shown) for sliding movement in the two directions of movement of the depending part 44 of the key 40 as the key is operated. Sliding movement of each of the members 54, 56 is guided and controlled by the provision of two slots 58 in each of these members which are elongated in the direction of movement of such members and which receive pins carried by the supporting surface. In FIG. 1 the lower end of the depending part 50 of the key 40 is shown positioned within C-shaped member 54 and it will be apparent that if the key is depressed the lower end part of the key will move member 54 until movement of the key stops or the end wall of slot 58 engages the pin within the slot. It will also be apparent that if the lower end part of the key is moved from C-shaped member 54 to C-shaped member 56, by movement of key part 50 about pivot pin 48, subsequent depression of the key will cause longitudinal sliding movement of C-shaped member 56. Each of the sliding members 54, 56 is constantly urged, as by spring 59, to the limit of its movement in a direction opposite to that in which it is moved by depression of key 40.

Means are provided by the invention which are operative upon successive depressions of the single key 40 to cause alternate operations of the shift key 60 and the unshift key 62 of the tape perforating machine, and such means will now be described. Solenoids 64 and 66 have their armatures operatively positioned to operate the shift and unshift keys, respectively, and one terminal of each of the windings of these solenoids is connected by lead 68 to the source of power 28, the other terminals being connected, respectively, to one contact 70 or 72 of each of two switches, the second contacts of which are grounded. These switches are positioned, respectively in the paths of movement of the sliding members 54, 56 so that one of them will be engaged and its contacts closed when the associated sliding member is moved by depression of the shift-unshift key 40 of the auxiliary apparatus for operating the keyboard of the tape perforating machine.

Means are provided by the invention which are operable on each depression of the shift-unshift key 40 to move the lower part of the depending key part 50 from one of the C-shaped sliding members 54, 56 to the other. Such means comprise two electromagnets 80, 82 which are positioned, respectively, outside of the sliding members 54, 56 and laterally of the direction of movement thereof, whereby upon their alternate energization the lower part of the key within the central space of the two C-shaped members will be moved alternately from one of such members to the other. One terminal of the winding of electromagnet 80 is connected to power and the other terminal is connected to one contact 84 of a single-pole double-throw switch, the movable contact 86 of which is carried by the grounded pivoted arm 88 of a latching relay 90, one terminal of the winding of which is connected to power and the other of which is connected to contact 70 of switch 74. The latching relay is provided with a pivoted latching arm 92 which is spring pressed toward the pivoted arm 88 and may be moved in the opposite direction to release position by an electromagnet 94, one terminal of which is connected to power and the other of which is connected by lead 96 to contact 72 of switch 76. Electromagnet 82 is associated with sliding member 56 and one terminal of its winding is connected to power while the other terminal is connected by leads 98 and 100 to fixed contact 102 of switch 86, and is also connected through leads 100 and 104 to signal light 106.

*Operation—FIGS. 1, 2 and 3*

The lower end of the depending part 50 of shift-unshift key 40 is always held within the recess in one or the other of slidable members 54, 56 by one or the other of the electromagnets 80, 82. In FIG. 1 the lower part of the key is shown in the recess in slidable member 54, and it will be observed that the electromagnet 80 is energized by reason of the closing of switch contacts 84, 86 completing a circuit from power at one terminal of the winding of the electromagnet, through the switch contacts 84, 86 to the grounded pivoted arm 88 of relay 90. The energization of electromagnet 80 produces a magnetic field holding the lower end of pivoted switch member 50 within the recess in sliding member 54.

If the shift-unshift key 40 is now depressed the lower end of the pivoted depending member 50 of the key will be moved, and as it bears on a lateral edge of the recess in sliding member 54, the sliding member will be moved with it in the direction toward the switch contacts 70, 74 and will close these contacts, completing a circuit from power at 28, through leads 26 and 68, solenoid winding 64 and switch contacts 70, 74 to ground. Completion of this circuit will operate shift key 60 of the tape perforating machine, producing the characteristic shift perforation. Closing of switch contact 70, 74 will also complete a circuit energizing the electromagnet of relay 90, pulling the pivoted arm 88 of the relay downwardly, in which position it will be latched by the spring-pressed latching arm 92 of the relay. Downward movement of pivoted arm 88 of the relay will move movable switch contact 86 out of engagement with fixed switch contact 84 and into engagement with fixed switch contact 102. Closing of these contacts will complete a circuit through the winding of electromagnet 82, energizing the electromagnet and pulling the lower end of pivoted key member 50 from the recess in sliding member 54 and into the recess in sliding member 56. At the same time a circuit will be completed to signal light 106 indicating that a shift perforation has been made and that the next operation of the shift-upshift key 40 will cause operation of the unshift key 62 of the tape perforating machine.

After movement of the lower end of pivoted key member 50 into the recess in sliding member 56 a subsequent depression of shift-unshift key 40 will move the lower end of the pivoted key member 50 in such a way as to move sliding member 56, causing it to close the contacts of switch 76, energizing the winding of solenoid 66 to produce operation of unshift key 62 of the tape perforating machine. Closing of the contacts of switch 76 will also complete a circuit through the release magnet 94 of relay 90, pulling the latch arm 92 of the relay out of latching engagement with pivoted arm 88 and causing the pivoted arm to move upwardly to close contacts 84, 86, thereby energizing electromagnet 80, causing the lower end of the depending pivoted switch member 50 to be pulled over into the recess in sliding member 54.

It will be seen that on each depression of the shift-unshift key the lower end of the depending member 50 of the key will be moved from engagement with one of the sliding members 54, 56 into engagement with the other so that the shift and unshift keys 60, 62 of the tape perforating machine are alternately operated on successive operations of the shift-unshift key.

Figure 4:
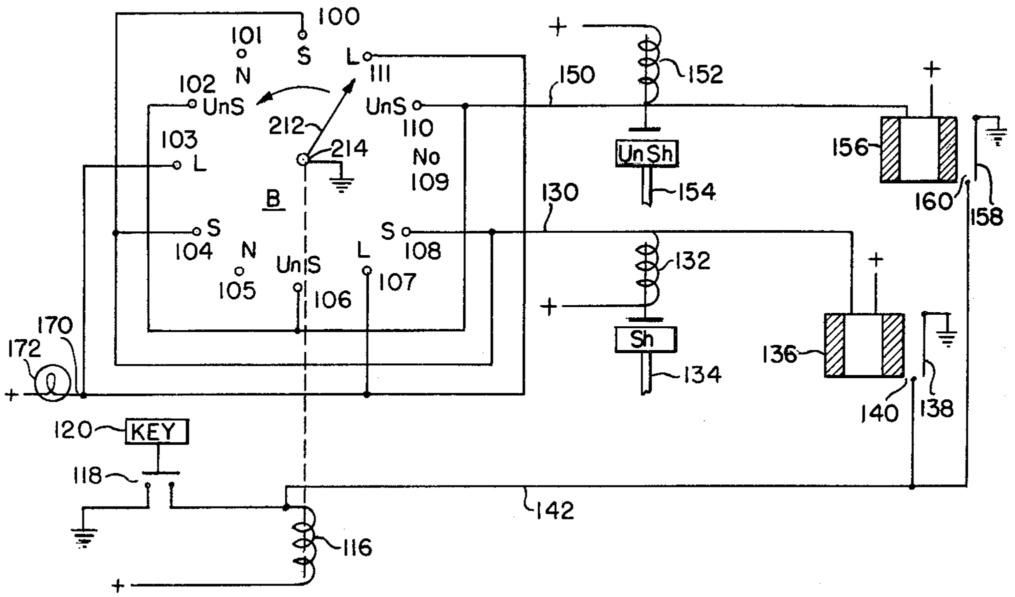
FIG. 4 is a circuit diagram showing a second embodiment of the invention.

*Description of FIGURE 4*

A second embodiment of the means provided by the invention for producing both shift and unshift perforations by the operation of a single key, which may be the shift key, the unshift key, or a separate key, and for producing the shift and unshift perforations alternately upon successive operation of this one key is illustrated in FIG. 4, in which is shown a stepping relay B having twelve fixed contacts which are numbered from 100 to 111, inclusive. These twelve contacts are shown arranged in a circle for purposes of clarity of disclosure and the contact arm 214 of the relay is grounded and rotatably mounted at 214 at its one end and its other and is positioned to engage the fixed contacts as it rotates. The contact arm is connected to the armature of a relay 116 which, when energized, causes the contact arm to rotate. One terminal of the relay winding is connected to power and the other terminal is connected to one contact of a normally open switch 118, the other contact of which is grounded. The switch is closed by depression of a key 120 of the auxiliary keyboard apparatus which, in accordance with the invention, may be the shift or the unshift key of the auxiliary keyboard apparatus or may be a separate key. In any case, when key 120 is depressed either a shift or an unshift tape perforation is produced, these being alternately produced by successive depressions of the key.

In the embodiment of the invention being described, the contacts are arranged in the following series and are labeled in the following way:

| Reference numeral | Contact | Contact label |
|---|---|---|
| 100 | Shift | S |
| 101 | Neutral | N |
| 102 | Unshift | UnS |
| 103 | Light | L |
| 104 | Shift | S |
| 105 | Neutral | N |
| 106 | Unshift | UnS |
| 107 | Light | L |
| 108 | Shift | S |
| 109 | Neutral | N |
| 110 | Unshift | UnS |
| 111 | Light | L |

In accordance with the invention the contacts 100, 104 and 108 of the stepping relay, which in this embodiment of the invention are the "shift" contacts and are so labeled, are electrically connected together and are connected by lead 130 to the open terminal of the winding of a solenoid 132, the other terminal of which is connected to power. The armature of this solenoid 132 is operatively associated with the shift key 134 of the tape perforating machine and when this solenoid is energized the shift key is depressed to produce the characteristic shift tape perforation. The lead 130 is also connected to the open terminal of the winding of a relay 136, the second terminal of which is connected to power. The armature 138 of this relay is grounded and carries one contact of a normally open switch 140, the second contact of which is connected by lead 142 to the open terminal of the winding of the solenoid 116 which operates the contact arm 112 of the stepping relay.

The contacts 102, 106 and 110 of the stepping relay, which in this embodiment of the invention are the "unshift" contacts and are so labeled, are electrically connected together and are connected by lead 150 to the open terminal of the winding of a solenoid 152, the other terminal of which is connected to power. The armature of this solenoid is operatively associated with the unshift key 154 of the tape perforating machine and when this solenoid is energized the unshift key is depressed to produce the characteristic unshift tape perforation. The lead 150 is also connected to the open terminal of the winding of a relay 156, the second terminal of which is connected to power. The armature 158 of this relay is grounded and carries one contact of a normally open switch 160, the second contact of which is connected by lead 142 to the open terminal of the winding of the solenoid 116 which operates the contact arm 112 of the stepping relay.

The contacts 101, 105 and 109 of the stepping relay are not connected in any circuit in the embodiment of the invention now being described and are therefore neutral and are so labeled in the drawings.

The fixed contacts 103, 107 and 111 of the stepping relay are electrically connected together and are connected by lead 170 to one terminal of lamp 172, the other terminal of which is connected to power.

*Operation—FIG. 4*

At the beginning of the operation of the tape perforating machine and the auxiliary keyboard apparatus in accordance with the sequence of operations for which the fixed contacts of the stepping relay B have been connected, the rotatable contact arm 112 of the stepping relay is in engagement with the lamp contact 111, this being its predetermined position at the start of the perforating cycle. In this position of the contact arm the lamp 172 is lit, showing that the next depression of shift-unshift key 120 will produce the characteristic shift tape perforation.

Depression of the shift-unshift key 120 closes switch 118, completing a circuit through the winding of solenoid 116 and operating the armature thereof to move contact arm 112 from contact 111, to contact 100 of the stepping relay, opening the circuit through lamp 172 to indicate to the operator that the next depression of the shift-unshift key 120 will produce the characteristic unshift tape perforation. Engagement of the contact arm with shift contact 100 completes a circuit from ground through the contact arm, contact 100, lead 130 and the windings of shift key operating solenoid 132 and shift relay 136, causing the armature of solenoid 132 to operate the shift key of the tape perforating machine to produce the characteristic shift tape perforation. Operation of shift relay 136 closes switch 140, completing a circuit from grounded armature 138 through switch 140, lead 142 and the winding of solenoid 116 to power, causing the relay 116 to operate to move the contact arm 112 of the stepping relay from shift contact 100 to neutral contact 101. As this contact is not connected in any circuit, all of the described completed circuits are opened, and the contact arm 112 remains in engagement with fixed contact 101.

If the shift-unshift key 120 is now depressed again switch 118 will be closed, energizing solenoid 116 to operate contact arm 112, causing it to move from neutral contact 101 to unshift contact 102. This completes a circuit from ground through the contact arm, unshift contact 102, lead 150 and the windings of unshift solenoid 152 and unshift relay 156. Energization of the unshift solenoid causes the armature thereof to operate the unshift key 154 of the tape perforating machine to produce the characteristic unshift tape perforation. Energization of the unshift relay 156 closes switch 160, completing a circuit from ground through the relay armature 158, switch 160, lead 142 and the winding of solenoid 116, causing the solenoid armature to move the contact arm 112 from the unshift contact 102 to the lamp contact 103, completing a circuit through lamp 172 and lighting the same to indicate to the operator that the next depression of the shift-unshift key will produce the characteristic shift perforation.

Further operation of the shift-unshift key 120 will produce the same sequence of operations which is described above. This operation illustrates the provision by the invention of step-by-step operating means for producing successive shift and unshift tape perforations by the use of a single key of the auxiliary apparatus.

While I have described and illustrated in this specification two embodiments of my invention, it will be apparent to those skilled in the arts to which it relates that other embodiments, as well as modifications of those disclosed, may be made and practiced without departing in any way from the spirit or scope of the invention, for the limits of which reference must be made to the appended claims.

What is claimed is:

1. Auxiliary apparatus for alternately operating the shift and unshift keys of a tape perforating machine by successive operations of a single control key forming part of the auixilary apparatus, comprising electrical operating means associated with each of the shift and unshift keys of the tape perforating machine for separately operating the associated key when energized, a control key, means for energizing one of said electrical operating means upon operation of said control key, and means also operable upon the same operation of said control key for establishing conditions which upon the next operation of the control key cause energization of the other of said electrical operating means.

2. Auxiliary apparatus for alternately operating the shift and unshift keys of a tape perforating machine by successive operations of a single control key forming part of the auxiliary apparatus, comprising an operating device associated with each of the shift and unshift keys of the tape perforating machine, a control key, means operated by depression of the control key to operate one of said operating devices, and means moved by the same operation of the control key to a position to cause operation of the other of said operating devices upon the next depression of the control key.

3. Auxiliary apparatus for alternately operating the shift and unshift keys of a tape perforating machine by successive operations of a single control key forming part of the auxiliary apparatus, comprising electrical operating means associated with each of the shift and unshift keys of the tape perforating machine for separately operating the associated key when energized, a control key, means for energizing one of said electrical operating means upon operation of said control key, and means also operable upon the same operation of said control key for establishing an open circuit which upon the next operation of the control key is completed to energize the other of said electrical operating means.

4. Auxiliary apparatus for alternately operating the shift and unshift keys of a tape perforating machine by successive operations of a single control key forming part of the auxiliary apparatus, comprising electrical operating means associated with each of the shift and unshift keys of the tape perforating machine for separately operating the associated key when energized, a control key, means operable by depression of said control key to energize one of said electrical operating means, and means operable by the same depression of the control key to move part of said last named means to a position in which it is operable to energize the other of said electrical operating means upon the next depression of the control key.

5. Auxiliary apparatus for alternately operating the shift and unshift keys of a tape perforating machine by successive operations of a single control key forming part of the auxiliary apparatus, comprising an electrical device associated with each of the shift and unshift keys of the tape perforating machine for operating the associated key when energized, a normally open circuit for each of said electrical key operating devices, a control key having a part movable to either of two positions independently of the remainder of the key, means operable upon depression of the control key to cause movement of said key part to close the circuit of one of said electrical key operating devices and also to energize means for moving said key part to the other of its positions, and means operable upon the next depression of the control key to cause movement of said key part to close the circuit of the other of said electrical key operating devices and to energize means for moving said key part to the first of its positions.

6. Auxiliary apparatus for alternately operating the shift and unshift keys of a tape perforating machine by successive operations of a single control key forming part of the auxiliary apparatus, comprising a solenoid associated with each of the shift and unshift keys of the tape perforating machine for operating the associated key when energized, an electrical circuit for the winding of each of said solenoids, a normally open switch in each of said circuits, an operating member normally positioned adjacent each switch and movable to close the associated switch, a control key having a part separately movable with respect to the remainder of the key into engagement with one or the other of said operating members whereby upon each operation of the control key said key part moves the operating member with which it is then in engagement to close the switch with which such operating member is associated to thereby energize one of said solenoids, and means operable upon each operation of the control key to move said key part into engagement with the other of said operating members whereby upon the next operation of the control key the other operating member will be moved to close the switch associated therewith to energize the other of said solenoids.

7. Auxiliary apparatus for alternately operating the shift and unshift keys of a tape perforating machine by successive operations of a single control key forming part of the auxiliary apparatus, comprising a solenoid associated with each of the shift and unshift keys of the tape perforating machine for operating the associated key when energized, an electrical circuit for the winding of each of said solenoids, a normally open switch in each of said circuits, an operating member normally positioned adjacent each switch and movable to close the associated switch, a control key having a part separately movable with respect to the remainder of the key into engagement with one or the other of said operating members whereby upon each operation of the control key said key part moves the operating member with which it is then in engagement to close the switch with which such operating member is associated to thereby energize one of said solenoids, an electromagnet associated with each of said operating members and each being positioned and operable when energized to move said key part from engagement with one of said operating members into engagement with the operating member associated with the energized electromagnet, a circuit for each of said electromagnets and including one of said switches, whereby upon each operation of the control key said key part is moved from engagement with one of said operating members into engagement with the other.

8. Auxiliary apparatus for alternately operating the shift and unshift keys of the keyboard of a tape perforating machine upon successive operations of a single control key forming part of the auxiliary apparatus, comprising a control key, an electrical operating device associated with each of the shift and unshift keys of the tape perforating machine, a switch device having a series of fixed contacts and a movable contact, means for operating said movable contact into sequential engagement with said fixed contacts, means operable on depression of the control key to complete a circuit through the movable contact, one of the fixed contacts of the switch device and the operating device for the shift key to produce a shift tape perforation, means operable by the same depression of said control key to move the movable contact of the switch device to the next fixed contact, and means operable on the next depression of the control key to complete a circuit through the movable contact, said next contact, and the operating device for the unshift key to produce an unshift tape perforation.

9. Auxiliary apparatus for alternately operating the shift and unshift keys of the keyboard of a tape perforating machine upon successive operations of a single control key forming part of the auxiliary apparatus, comprising a control key, a stepping relay having a plurality of fixed contacts, a movable contact and means for moving the movable contact successively into engagement with the fixed contacts, an electrical operating device associated with each of the shift and unshift keys of the tape perforating machine, alternate ones of said fixed contacts being connected in normally open circuits with alternate ones of said electrical operating devices whereby engagement of said movable contact successively with said fixed contacts will cause alternate operation of the shift and unshift keys of the tape perforating machine, and means operable upon engagement of the movable contact with each fixed contact for first energizing one of said electrical operating devices and then moving the movable contact to a position from which it is moved on the next depression of the control key into engagement with the next fixed contact.

References Cited by the Examiner

UNITED STATES PATENTS

| | | | |
|---|---|---|---|
| 2,390,413 | 12/45 | Ayers | 234—5 |
| 2,739,649 | 3/56 | Happel et al. | 234—23 |
| 2,902,092 | 9/59 | Heldebrandt | 234—23 |
| 2,980,225 | 4/61 | Intagliata et al. | 234—23 |

ANDREW R. JUHASZ, *Primary Examiner*.